United States Patent [19]

Kaufmann

[11] Patent Number: 5,102,251
[45] Date of Patent: Apr. 7, 1992

[54] SUPPLY SYSTEM FOR DEVICES THAT OPERATE WITH THE AID OF CAPILLARY FORCES AND ARE USED TO APPLY LIQUIDS

[75] Inventor: Rainer Kaufmann, Hamburg, Fed. Rep. of Germany

[73] Assignee: Dataprint Datendrucksysteme R. Kaufmann KG, Hamburg, Fed. Rep. of Germany

[21] Appl. No.: 508,942

[22] Filed: Apr. 13, 1990

[30] Foreign Application Priority Data

Apr. 15, 1989 [DE] Fed. Rep. of Germany ....... 3912411

[51] Int. Cl.⁵ .................................................. B43K 5/10
[52] U.S. Cl. ................................. 401/151; 401/230; 401/224; 401/225; 401/229
[58] Field of Search ............... 401/151, 198, 199, 230, 401/225, 227, 228, 236–237, 229, 223, 224, 252, 232

[56] References Cited

U.S. PATENT DOCUMENTS

| | | | |
|---|---|---|---|
| 2,522,553 | 9/1950 | Wittnebert | 401/223 |
| 2,684,052 | 7/1954 | Rickmeyer | 401/198 X |
| 2,694,382 | 11/1954 | Miessner | 401/225 X |
| 2,766,729 | 10/1956 | Kovacs | 401/225 |
| 2,847,975 | 8/1958 | Lawton | 401/223 X |
| 3,113,336 | 12/1963 | Langnickel | 401/198 X |
| 3,442,597 | 5/1969 | Hebborn et al. | 401/259 |
| 4,095,907 | 6/1978 | Kuparinen | 401/258 X |
| 4,207,012 | 6/1980 | Kuparinen | 401/258 |
| 4,708,506 | 11/1987 | Herrnring | 401/230 X |
| 4,930,921 | 6/1990 | Anderka | 401/258 |

FOREIGN PATENT DOCUMENTS

60945 3/1968 Fed. Rep. of Germany ...... 401/223

*Primary Examiner*—Danton D. DeMille
*Attorney, Agent, or Firm*—Robert W. Becker & Associates

[57] ABSTRACT

A supply system is provided for a device that operates with capillary forces and is used to apply liquids. The system includes receptacles that accommodate the liquid and are closed off relative to the atmosphere. Also provided is an application element that communicates with the receptacles via a feed mechanism and serves for the application of the liquid, for which purpose the application element has a discharge. Each of the receptacles is provided with an inlet and an outlet, with the receptacles being interconnected in the manner of a series connection by having the outlet of one receptacle communicate with the inlet of another receptacle. The capillarity of the inlets and outlets is greater than the capillarity of the receptacles in the vicinity of the inlets and outlets thereof, and is less than the capillarity of the discharge of the application element.

16 Claims, 3 Drawing Sheets

SUPPLY SYSTEM FOR DEVICES THAT OPERATE WITH THE AID OF CAPILLARY FORCES AND ARE USED TO APPLY LIQUIDS

BACKGROUND OF THE INVENTION

The present invention relates to a supply system for a device, such as a writing instrument, drafting or drawing instrument, painting device, printing device, or the like, that operates with the aid of capillary forces and is used to apply liquid, with the system including receptacle means that accommodates the liquid and is closed off relative to the atmosphere, and also including an application instrument, such as a nib or the like, that communicates with the receptacle means via a feed mechanism and serves for the application of the liquid, for which purpose the application element has a discharge means.

With devices of the aforementioned type, precautions must be taken that liquid can flow out of the discharge means of the application element only when discharge is desired, and also only in the desired quantity; liquid must not discharge only as a result of the force of gravity.

Technical approaches to accomplish these requirements are known. For example, with writing instruments the liquid is frequently stored in an entirely capillary manner, with writing being possible due to the fact that the adhesion of the liquid to the surface, and the ultimate strength of the liquid filament, are greater than those of the capillary holding forces of the liquid in the capillary reservoir. However, in so doing the capillary holding forces must be greater than the force of gravity of the stored liquid, which can only be achieved with very high capillarity starting from the premise that in order to achieve a large writing capacity, the entire capacity of the interior hollow space of the writing instrument should be utilized. Unfortunately, the high capillarity of the reservoir represents a great limitation in the selection of writing nibs, since such nibs must have an even greater capillarity than the reservoir in order to ensure a satisfactory operation of the instrument during the writing, drafting, drawing, painting, printing, etc. process.

With the exception of ball points or roller balls, writing nibs having a high capillarity are for various reasons at the present time not suitable for longer writing periods due to an inadequate wear resistance.

A further drawback of the aforementioned type of known reservoir or storage system is that due to a nonuniform construction resulting from manufacture, the reservoir cannot discharge or dispense the entire quantity of writing fluid, with the disadvantageous result that the stroke intensity diminishes during a continued emptying of the reservoir.

Pursuant to another known approach for holding liquid above a discharge opening of an application element without automatic dispensing, the liquid that is to be applied is held in a closed receptacle via a partial vacuum and the capillarity of an air inlet opening. The capillarity of the air inlet opening must be such that at least the liquid column can be held that extends from the air inlet opening to the opening of the application element. In practice, with this arrangement considerably smaller capillarities can be realized than with the previously described capillary storage system. Accordingly, the capillarity of the writing nib could also be lower than is required, for example, for fountain pens and ink drawing instruments.

A drawback of this type of liquid storage is that as emptying of the receptacle increases, the air that replaces the liquid expands as the air pressure decreases and/or the temperature increases, so that part of the liquid escapes from the receptacle. To prevent liquid from dripping from the device, the liquid that escapes from the receptacle is collected in capillary reservoirs that are expressly provided for that purpose. If subsequent thereto the temperature again drops, the liquid must be drawn back into the closed receptacle from the capillary reservoir in as complete a manner as possible, since otherwise the capillary reservoir would overflow after a number of temperature fluctuations. The reliability of this system decreases as the volume of the receptacle increases.

It is an object of the present invention to provide a supply system of the aforementioned general type that on the one hand is in a position to accommodate very large writing fluid volumes, and that on the other hand is practically independent of the temperature and air pressure fluctuations that can be expected during normal operation, with such a supply system permitting writing instruments, drafting or drawing instruments, painting devices, printing devices, etc. to be produced with wear resistant material only at the writing nib or the like, hence making it possible to produce the devices as a whole in an economical manner. It is a further object of the present invention to provide a supply system that makes it possible to completely empty the writing fluid from the receptacle provided therefor, and that prevents writing fluid from dripping out of the device that is equipped with such a supply system.

BRIEF DESCRIPTION OF THE DRAWINGS

These and other objects and advantages of the present invention will appear more clearly from the following specification in conjunction with the accompanying schematic drawings, in which.

SUMMARY OF THE INVENTION

Figure 1:
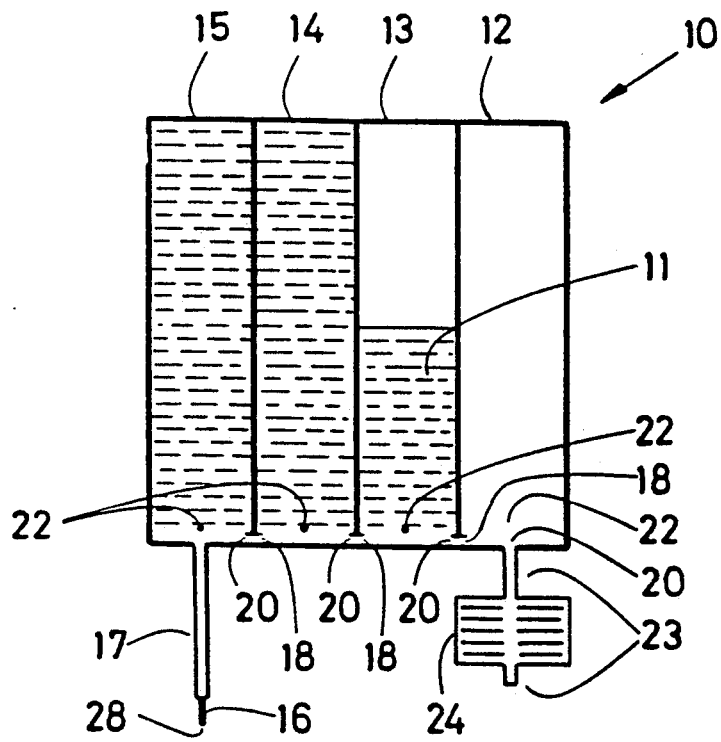
FIG. 1 shows the fundamental configuration of one exemplary embodiment of an inventive supply system that comprises four receptacles.

The supply system of the present invention is characterized primarily in that the receptacle means comprises a plurality of receptacles, each of which is provided with an inlet means and an outlet means, with the receptacles being interconnected in the manner of a series connection by having the outlet means of one receptacle communicate with the inlet means of another of the receptacles, with the capillarity of the inlet means and the outlet means being greater than the capillarity of the receptacles in the vicinity of the inlet means and outlet means thereof, and being less than the capillarity of the discharge means of the application element.

Pursuant to the present invention, during operation when liquid is dispensed via the application element that is provided therefor, the receptacles advantageously automatically successively empty, starting with the first receptacle that communicates with the air. Once a receptacle has been emptied, it communicates with the air so that the expansion of air in the empty receptacles cannot exert any influence upon the operation of the device that is equipped with these receptacles. Fluctuations in temperature and air pressure impact only that receptacle that at any given time is only partially filled. As a result, in conformity with the object of the invention, the inventive supply system increases reliability against an uncontrolled dispensing of the liquid relative to a single-receptacle system having the same overall volume by a factor equal to the number of receptacles of the inventive supply system; in other words, if four receptacles are provided, by a factor of four.

The successive emptying of the receptacles accompanied by a dispensing of liquid during operation is achieved due to the fact that the capillarity of the inlet and outlet means is greater than the capillarity of the receptacles in this region, in which connection, in order to make it easier to follow, the inlet and outlet means will be assumed to have the same capillarity. In principle, the capillarity of the inlet and outlet means can also differ. An air bubble that results at the inlet means of a receptacle due to dispensing of a liquid via the outlet means, has, due to the lower capillarity of the receptacle in this region, space available that permits the air bubble to assume a greater diameter than the outlet means has. As a result, under the effect of the surface tension of the liquid that surrounds the air bubble, the air bubble can no longer enter the outlet means without force.

A force could then occur if the air bubble completely closes off the outlet means in an unfavorable situation. To prevent this, pursuant to the present invention mainly in receptacles having a diameter of only a few millimeters and less, a channel is advantageously disposed that passes through the receptacle, preferably to the outlet means. In this connection, the capillary channel advantageously has a capillarity that is greater than the capillarity of the receptacle.

The capillarity of the capillary channel preferably corresponds to the capillarity of the inlet means and the outlet means. This ensures that even in the capillary channel, the air bubble cannot automatically enter, as a result of which the flow through the channel into the outlet means cannot be interrupted. Similarly, the inventive capillary channel in the receptacle prevents an air bubble that fills the cross-sectional area of the receptacle from interrupting subsequent flow out of the region of the receptacle that is disposed above the air bubble.

Another criterion for the operation of the supply system is that the capillarities of the inlet means and of the outlet means of the receptacles be less than the capillarity of the discharge means of the application element. This assures that the liquid that is to be applied remains at the discharge means of the application element even if the partial vacuum in the only partially filled receptacle increases due to temperature and air pressure fluctuations and a tendency occurs to draw back the liquid. Instead, the air is drawn in through the inlet means of the receptacle due to its lower capillarity. Similarly, the lower capillarity of the inlet and outlet means of the receptacle relative to the discharge means of the application element prevents liquid from escaping out of the discharge means of the application element if air in the only partially filled receptacle expands. Instead, the excess liquid flows through the inlet means of the receptacle and then through all of the outlet and inlet means of the previous, already emptied receptacles and into the air supply line.

The air supply line to a first one of the plurality of receptacles is preferably connected with a capillary reservoir that is of such a size that it can accommodate the quantity of liquid that escapes from the only partially filled first receptacle due to fluctuations in temperature and air pressure.

As an additional safety measure, further capillary reservoirs can advantageously be provided between the receptacles between the respective inlet and outlet means thereof.

The receptacles are advantageously axially tubularly disposed next to one another in the operating position of the device. This results in straightforward relationships, especially when the liquid is introduced into the receptacles, since all of the receptacles can be filled simultaneously with a multiple jet head. In addition, this provides the possibility of disposing all of the inlet and outlet means at approximately the same level, relative to the operating position of the device, and as low as possible relative to the discharge means of the application element.

In this regard, the inlet and outlet means of the receptacle are advantageously disposed in the lower region of the receptacles relative to the operating position of the device. The advantageous result of this is that the capillarity of the inlet means, and hence ultimately also the capillarity of the discharge means of the application element, can be low. This is so because the capillarity of the inlet means need only be high enough that the liquid column, starting from the level of the discharge means of the application element, can be held to the maximum height of the inlet means thereabove.

The connection between the last one of the receptacles of the series connection that is to be emptied, and the application element, is established via a feed mechanism. This feed mechanism is advantageously provided with a device that controls the flow of liquid. In addition to the aforementioned capillary forces, this device can also be used to prevent an undesired dripping of liquid out of the discharge means of the application element.

For the same purpose, a capillary reservoir is connected with the feed mechanism for accommodating excess liquid. The stored liquid is preferably used during operation of the device, so that the reservoir can constantly be used for its intended purpose.

In certain cases, the device that controls the flow of liquid can also advantageously be a valve that is mechanically or electrically controlled and always prevents flow if it is not desired to dispense liquid out of the discharge means of the application element. As already mentioned, the receptacles are advantageously axially disposed in the form of segments of a circle or of a polygon, which advantageously results in a compact arrangement accompanied by volumes and dimensions that are consistent for all of the receptacles.

Finally, the connections between the receptacles, the air lines, the capillary reservoirs, and the possibly provided feed mechanism are advantageously realized by a single plug or insert means that closes off the receptacles, so that the inventive supply system essentially comprises only three parts, namely a one-piece multireceptacle, the described insert means, and a conventional application element. Such an embodiment also facilitates the assembly and the filling of the liquid, and is relatively economical to produce.

Further specific features of the present invention will be described in detail subsequently.

DESCRIPTION OF PREFERRED EMBODIMENTS

Referring now to the drawings in detail, the inventive supply system 10 (see in particular FIG. 1) comprises a plurality of receptacles 12, 13, 14, 15 that operationally speaking are successfully disposed in the manner of a series connection. The receptacles 12-15 serve to accommodate the liquid 11, which represents the writing fluid. It should be noted that the configuration provided for the receptacles 12-15 in FIG. 1 is merely for the sake of facilitating illustration. In principle, the receptacles 12-15 can be embodied in any desired manner in conformity with their application in writing instruments, drafting or drawing instruments, painting devices, printing devices, etc. During operation, the supply system 10 is disposed essentially vertically, i.e. the (here) tubular receptacles 12-15 are similarly disposed vertically. Each of the illustrated receptacles 12-15 is provided with an outlet means 18 and an inlet means 20 in the lower portion of the receptacle, whereby in each case the outlet means 18 of one receptacle communicates with the inlet means 20 of the next receptacle.

The capillarity of the outlet means 18 and of the inlet means 20 is greater than the capillarity of the receptacle space 22 in the vicinity of the inlet means 20 and the outlet means 18. As a result, in a normal situation, air bubbles that enter through the inlet means 20 of a receptacle 12-15 as a consequence of removal of liquid 11 during operation do not pass through the outlet means 18 as long as there is still liquid 11 in the pertaining receptacle 12-15.

An air line 23 is connected to the first receptacle 12 of the plurality of illustrated receptacles via the inlet means 20. The air line 23 communicates with a capillary reservoir 24 that in turn communicates with the atmosphere, possibly via a portion of the air line 23 that is extended beyond the capillary reservoir 24. The last receptacle 15 of the plurality of receptacles, which is the last receptacle to be emptied during use of the liquid 11, communicates with the application element 16 via a feed mechanism 17. The application element 16 is provided with a discharge means 28 for the liquid 11. The capillarity of the inlet means 20 and the outlet means 18 of the receptacles 12-15 is less than the capillarity of the discharge means 28 of the application element 16. As a result, when the air above the liquid 11 of the partially filled receptacle 12-15, in the illustrated embodiment receptacle 13, is warmed up, the excess liquid 11 passes through the inlet means 20 of the receptacle 13 and, via the outlet means 18 and the inlet means 20 of the receptacle 12, as well as via the air line 23, into the capillary reservoir 24, and does not run out through the discharge means 28.

Figure 2:
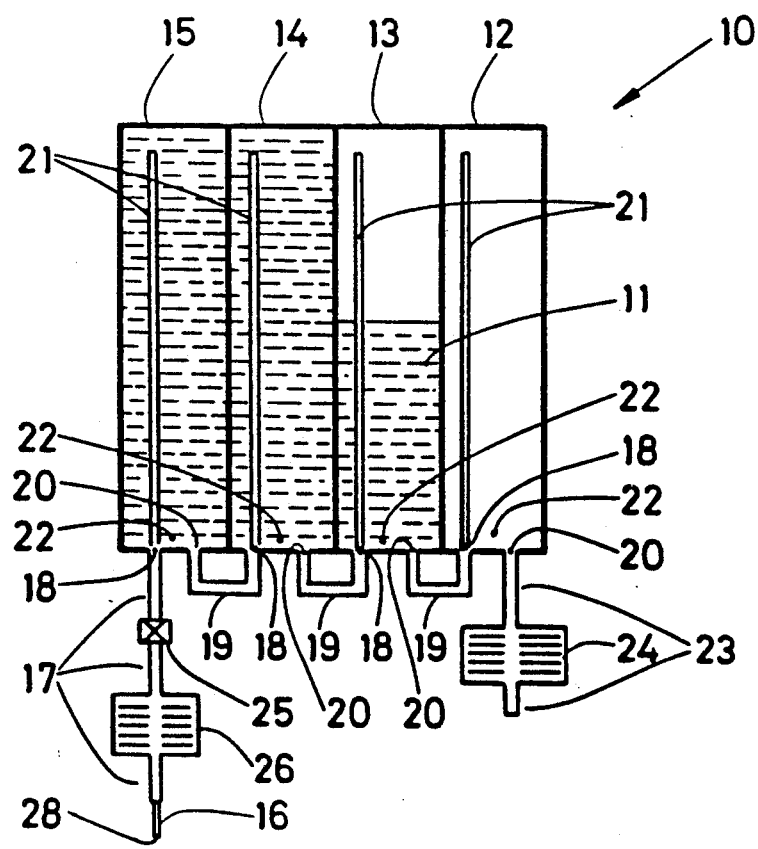
FIG. 2 shows the fundamental configuration of a further exemplary embodiment of an inventive supply system that is a modification of the embodiment illustrated in FIG. 1.

The embodiment illustrated in FIG. 2 differs from that of FIG. 1 in that a capillary channel 21 passes through the receptacles 12-15 and feeds directly into the respective outlet 18 of the receptacles 12-15, and in that the feed mechanism 17 contains a device 25 that controls the flow and communicates with a capillary reservoir 26. Furthermore, in this embodiment the inlet means 20 and the outlet means 18 of the respectively interconnected receptacles 12-15 are interconnected via a separate connecting line 19.

The capillary channel 21, the capillarity of which generally corresponds approximately to that of the outlet means 18 and the inlet means 20, together with the other inventive capillary conditions at the outlet means 18 and inlet means 20 ensures an uninterrupted transport of the liquid 11 within the receptacles 12-15, since air bubbles that form within the liquid 11 in the receptacles 12-15 cannot enter the capillary channel 21, thus ensuring the direct and uninterrupted flow of the liquid 11 into the respective outlet 18.

The device 25 that controls the flow can, for example, be of such a size that per unit of time no more liquid 11 passes through than is needed during customary operation. As a consequence, a suddenly issuing excess of liquid 11, as can occur due to an impact or excessive heat, can be intercepted or restrained at the feed mechanism 17. The device 25 that controls the flow can, for example, also be a valve that is mechanically or electrically controlled in such a way that liquid 11 can issue only during a desired operation. The capillary reservoir 26 that also communicates with the feed mechanism 17 has the function of collecting excess liquid 11 and again dispensing it during operation.

Figure 3:
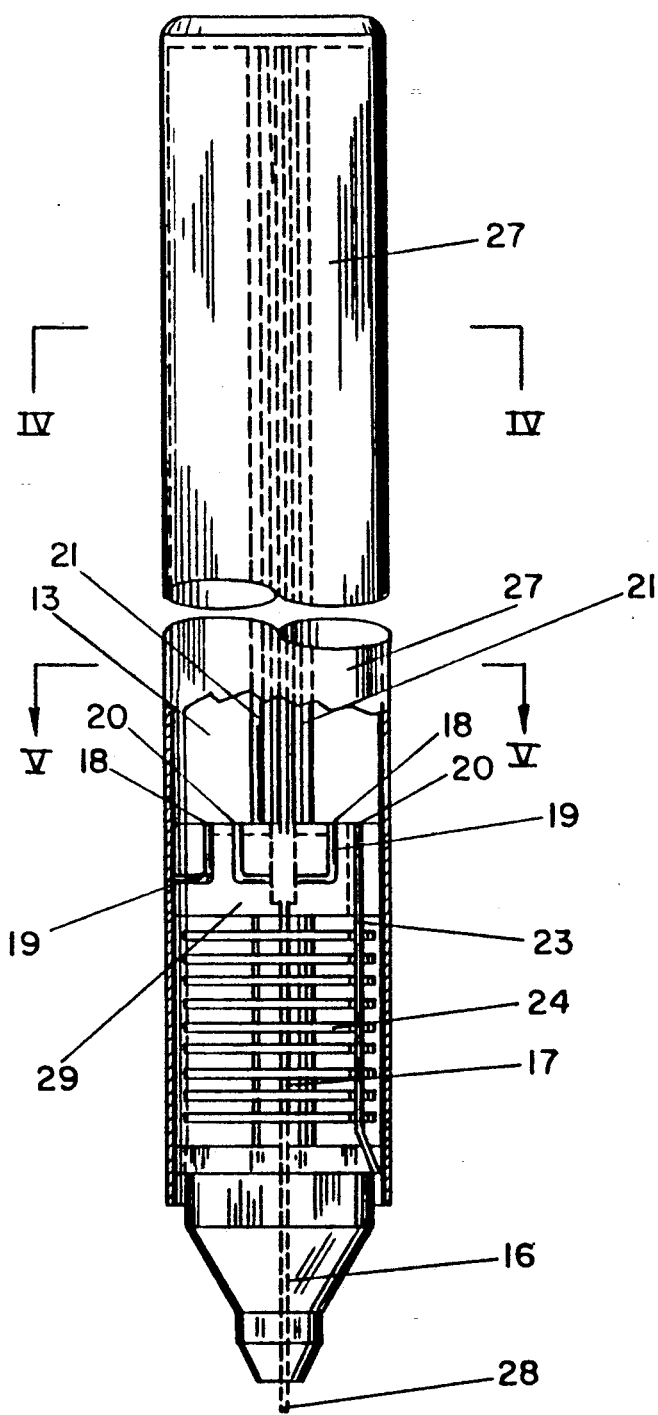
FIG. 3 is a partially cross-sectioned view of a writing instrument that utilizes the inventive supply system.
Figure 4:
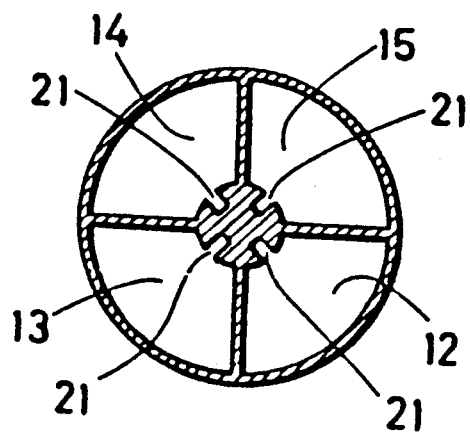
FIG. 4 is a cross-sectional view taken along the line IV—IV in FIG. 3.
Figure 5:
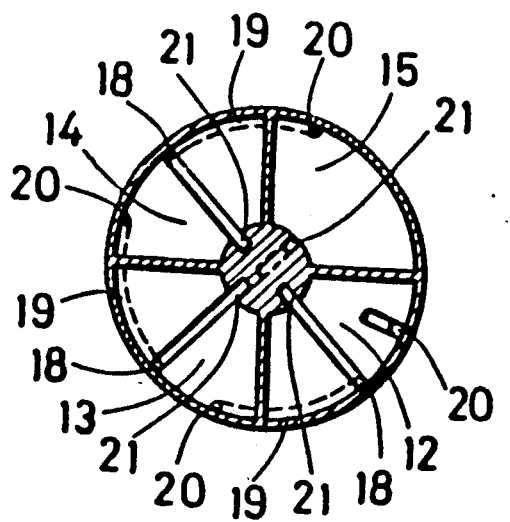
FIG. 5 is a cross-sectional view taken along the line V—V in FIG. 3.

The various views of FIGS. 3, 4, and 5 show a supply system 10 installed in a device 27, such as a writing instrument, drafting or drawing instrument, painting device, printing device, or the like. In this embodiment of the supply system 10, the receptacles 12-15 are disposed in an axial circular segmented arrangement. Also provided is a plug or insert means 29 that closes off the receptacles 12-15 and in which can be disposed the connections or connecting lines 19 between the outlet means 18 and the inlet means 20, the air line 23, the capillary reservoir 24, as well as the feed mechanism 17. The feed mechanism 17 supplies an application element 16 with liquid 11 that is dispensed via the discharge means 28.

The present invention is, of course, in no way restricted to the specific disclosure of the specification and drawings, but also encompasses any modifications within the scope of the appended claims.

What I claim is:

1. In a supply system for a device that operates with the aid of capillary forces and is used to apply liquid, said system including a supply receptacle means that accommodates said liquid and is closed off relative to the atmosphere, and also including an application element that communicates with said supply receptacle means via a feed mechanism and serves for the application of said liquid, for which purpose said application element has a discharge means, the improvement wherein:

said supply receptacle means comprises a plurality of supply receptacles, each of which is provided with an inlet means and an outlet means, with said supply receptacles being interconnected in the manner of a series connection by having said outlet means of one of said supply receptacles communicating with said inlet means of another one of said supply receptacles;

the capillarity of said inlet means and said outlet means is greater than the capillarity of said supply receptacles in the vicinity of said inlet and outlet means thereof;

said capillarity of said inlet means and said outlet means is less than the capillarity of said discharge means of said application element; and in an operating position of said device, said inlet and said outlet means of said supply receptacles are disposed in a lower portion of each supply receptacle.

2. A supply system according to claim 1, in which said supply receptacles, relative to an operating position of said device, are disposed at least partially adjacent one another to form an essentially tubular configuration.

3. A supply system according to claim 1, in which each of said supply receptacles is provided with at least one capillary channel that passes through said supply receptacle into the vicinity of said outlet means thereof, with the capillarity of said channel being greater than the capillarity of said supply receptacle.

4. A supply system according to claim 1, which includes an air inlet line that leads to a first one of said supply receptacles, with said air inlet line being connected to a capillary reservoir.

5. A supply system according to claim 4, in which said air inlet line is disposed in an insert means that closes off said supply receptacles.

6. A supply system according to claim 4, in which said capillary reservoir that is connected to said air inlet line is disposed in an insert means that closes off said supply receptacles.

7. A supply system according to claim 1, which includes capillary reservoir means disposed between at least two of said supply receptacles.

8. A supply system according to claim 7, in which said capillary reservoir means is disposed in an insert means that closes off said supply receptacles.

9. A supply system according to claim 1, in which said feed mechanism is provided with a capillary reservoir.

10. A supply system according to claim 9, in which said capillary reservoir that is connected with said feed mechanism is disposed in an insert means that closes off said supply receptacles.

11. A supply system according to claim 1, in which said feed mechanism is provided with a device that controls the flow of said liquid therethrough.

12. A supply system according to claim 11, in which said flow control device is a valve.

13. A supply system according to claim 11, in which said flow control device is disposed in an insert means that closes off said supply receptacles.

14. A supply system according to claim 1, in which said supply receptacles are axially disposed essentially in the form of segments of a circle or polygon.

15. A supply system according to claim 1, in which said inlet mean sand outlet means are disposed in an insert means that closes off said supply receptacles.

16. A supply system according to claim 1, which includes connecting line means for connecting said outlet means of one of said supply receptacles with said inlet means of another one of said supply receptacles, with said connecting line means being disposed in an insert means that closes off said supply receptacles.

* * * * *